(12) United States Patent
Grover et al.

(10) Patent No.: US 12,047,224 B2
(45) Date of Patent: Jul. 23, 2024

(54) METHODS, SYSTEMS, AND COMPUTER READABLE MEDIA FOR RESTORATION OF DIAMETER CONNECTIVITY

(71) Applicant: Oracle International Corporation, Redwood Shores, CA (US)

(72) Inventors: Lalit Grover, Haryana (IN); Jayesh Shrimali, Telangana (IN); Vimal Chandra Tewari, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 279 days.

(21) Appl. No.: 17/491,984

(22) Filed: Oct. 1, 2021

(65) Prior Publication Data

US 2023/0104721 A1     Apr. 6, 2023

(51) Int. Cl.
*G06F 15/16* (2006.01)
*H04L 41/0654* (2022.01)
*H04L 67/141* (2022.01)

(52) U.S. Cl.
CPC ........ *H04L 41/0654* (2013.01); *H04L 67/141* (2013.01)

(58) Field of Classification Search
CPC ................. H04L 41/0654; H04L 67/141
See application file for complete search history.

(56) References Cited

U.S. PATENT DOCUMENTS

| | | | | |
|---|---|---|---|---|
| 7,698,458 B1* | 4/2010 | Liu | ........................ | H04L 63/102 370/395.32 |
| 8,964,529 B2* | 2/2015 | Mann | ..................... | H04W 76/19 370/242 |
| 2004/0097191 A1* | 5/2004 | Meyer | ................... | H04W 36/06 455/13.1 |
| 2014/0280768 A1* | 9/2014 | Calo | ....................... | H04L 69/16 709/219 |
| 2017/0048190 A1 | 2/2017 | McCann | | |
| 2017/0302618 A1* | 10/2017 | Porika | ................... | H04M 15/63 |

(Continued)

OTHER PUBLICATIONS

Fajardo et al., "Diameter Base Protocol," Internet Engineering Task Force (IETF), Request for Comments 6733, pp. 1-152 (Oct. 2012).

(Continued)

*Primary Examiner* — Padma Mundur

(74) *Attorney, Agent, or Firm* — Jenkins, Taylor & Hunt, P.A.

(57) ABSTRACT

Methods, systems, and computer readable media for restoration of Diameter connectivity. An example method includes accepting a first Diameter connection with a Diameter client having a Diameter identifier. The method includes receiving a request to establish a new Diameter connection with the Diameter identifier. The method includes holding the request to establish a new Diameter connection for a specified time limit, and, while holding the request, probing the first Diameter connection to determine whether the first Diameter connection has been broken. In response to determining that the first Diameter connection has been broken, the method includes aborting the first Diameter connection and accepting a second Diameter connection with the Diameter client having the Diameter identifier.

14 Claims, 6 Drawing Sheets

(56) References Cited

U.S. PATENT DOCUMENTS

2018/0176141 A1    6/2018  Gupta et al.

OTHER PUBLICATIONS

Aboba et al., "Authentication, Authorization and Accounting (AAA) Transport Profile," Network Working Group, Request for Comments 3539, pp. 1-39 (Jun. 2003).
International Search Report and Written PCT/US2022/039981 dated Dec. 1, 2022.

* cited by examiner

METHODS, SYSTEMS, AND COMPUTER READABLE MEDIA FOR RESTORATION OF DIAMETER CONNECTIVITY

TECHNICAL FIELD

The subject matter described herein relates to telecommunications networks. More particularly, the subject matter described herein relates to methods, systems, and computer readable media for restoration of Diameter connectivity.

BACKGROUND

Diameter is an authentication, authorization, and accounting (AAA) protocol used extensively in telecommunications core networks for carrying subscriber and policy information among core network elements. Diameter works at the application layer and uses, e.g., transmission control protocol (TCP) or stream control transmission protocol (SCTP) as the underlying transport protocol. A Diameter client establishes a transport connection with the server before sending a CER (Capability Exchange Request) message to initiate a Diameter connection. The Diameter connection is established once the server responds back with a CEA (Capability Exchange Answer) message.

If a Diameter client fails, restarts, or switches active nodes, it may take some time for the connection to be restored. The delay in restoring Diameter connectivity can potentially lead to service impacting issues at client such as call drops, accounting loss, authorization/accounting failures.

In light of these and other difficulties, there exists a need for methods, systems, and computer readable media for restoration of Diameter connectivity.

SUMMARY

A method for restoration of Diameter connectivity includes accepting a first Diameter connection with a Diameter client having a Diameter identifier. The method includes receiving a request to establish a new Diameter connection with the Diameter identifier. The method includes holding the request to establish a new Diameter connection for a specified time limit, and, while holding the request, probing the first Diameter connection to determine whether the first Diameter connection has been broken. The method includes determining that the first Diameter connection has been broken and, in response to determining that the first Diameter connection has been broken, aborting the first Diameter connection and accepting a second Diameter connection with the Diameter client having the Diameter identifier.

According to another aspect of the subject matter described herein, determining that the first Diameter connection has been broken comprises determining that the first Diameter connection has been broken before reaching the specified time limit.

According to another aspect of the subject matter described herein, probing the first Diameter connection comprises sending a Diameter watchdog request to the Diameter client on the first Diameter connection.

According to another aspect of the subject matter described herein, determining that the first Diameter connection has been broken comprises receiving a reset message from the Diameter client.

According to another aspect of the subject matter described herein, the reset message is a transmission control protocol (TCP) message sent as a result of the Diameter client treating the Diameter watchdog request as received on an unexpected connection.

According to another aspect of the subject matter described herein, establishing the first Diameter connection comprises creating a first peer state machine for the first Diameter connection with the Diameter identifier.

According to another aspect of the subject matter described herein, aborting the first Diameter connection and establishing the second Diameter connection comprises cleaning up the first peer state machine and then resuming processing of the request to establish the new Diameter connection by creating a second peer state machine.

According to another aspect of the subject matter described herein, the Diameter client is deployed in a high availability configuration comprising an active node and one or more standby nodes configured to takeover an active role in response to a failure of the active node.

According to another aspect of the subject matter described herein, the specified time limit for holding the request to establish a new Diameter connection is less than a Diameter transaction timeout.

According to another aspect of the subject matter described herein, establishing the first Diameter connection comprises establishing a transport connection and then receiving a capability exchange request (CER) message on the transport connection.

According to another aspect of the subject matter described herein, a system for restoration of Diameter connectivity includes at least one processor and a memory. The system further includes a Diameter server implemented by the at least one processor and configured for accepting a first Diameter connection with a Diameter client having a Diameter identifier; receiving a request to establish a new Diameter connection with the Diameter identifier; holding the request to establish a new Diameter connection for a specified time limit, and, while holding the request, probing the first Diameter connection to determine whether the first Diameter connection has been broken; and determining that the first Diameter connection has been broken and, in response to determining that the first Diameter connection has been broken, aborting the first Diameter connection and accepting a second Diameter connection with the Diameter client having the Diameter identifier.

According to another aspect of the subject matter described herein, determining that the first Diameter connection has been broken comprises determining that the first Diameter connection has been broken before reaching the specified time limit.

According to another aspect of the subject matter described herein, probing the first Diameter connection comprises sending a Diameter watchdog request to the Diameter client on the first Diameter connection.

According to another aspect of the subject matter described herein, determining that the first Diameter connection has been broken comprises receiving a reset message from the Diameter client.

According to another aspect of the subject matter described herein, the reset message is a transmission control protocol (TCP) message sent as a result of the Diameter client treating the Diameter watchdog request as received on an unexpected connection.

According to another aspect of the subject matter described herein, establishing the first Diameter connection comprises creating a first peer state machine for the first Diameter connection with the Diameter identifier.

According to another aspect of the subject matter described herein, aborting the first Diameter connection and establishing the second Diameter connection comprises cleaning up the first peer state machine and then resuming processing of the request to establish the new Diameter connection by creating a second peer state machine.

According to another aspect of the subject matter described herein, the Diameter client is deployed in a high availability configuration comprising an active node and one or more standby nodes configured to takeover an active role in response to a failure of the active node.

According to another aspect of the subject matter described herein, the specified time limit for holding the request to establish a new Diameter connection is less than a Diameter transaction timeout.

According to another aspect of the subject matter described herein, establishing the first Diameter connection comprises establishing a transport connection and then receiving a capability exchange request (CER) message on the transport connection.

According to another aspect of the subject matter described herein, a non-transitory computer readable medium having stored thereon executable instructions that when executed by a processor of a computer control the computer to perform steps is provided. The steps include accepting a first Diameter connection with a Diameter client having a Diameter identifier; receiving a request to establish a new Diameter connection with the Diameter identifier; holding the request to establish a new Diameter connection for a specified time limit, and, while holding the request, probing the first Diameter connection to determine whether the first Diameter connection has been broken; and determining that the first Diameter connection has been broken and, in response to determining that the first Diameter connection has been broken, aborting the first Diameter connection and accepting a second Diameter connection with the Diameter client having the Diameter identifier.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for restoration of Diameter connectivity.

Diameter is an authentication, authorization, and accounting (AAA) protocol used extensively in telecommunications core networks for carrying subscriber and policy information among core network elements. Diameter works at the application layer and uses, e.g., transmission control protocol (TCP) or stream control transmission protocol (SCTP) as the underlying transport protocol. A Diameter client establishes a transport connection with the server before sending a CER (Capability Exchange Request) message to initiate a Diameter connection. The Diameter connection is established once the server responds back with a CEA (Capability Exchange Answer) message.

The Diameter connections are usually persistent in nature, i.e., they remain established for long periods of time, such as weeks, months or years. Diameter network elements (or nodes) maintain a peer state machine for each peer they are connected to. They continuously monitor the health of the underlying transport connection and the liveness of the peer application so they can take appropriate action as soon as they detect any problems such as an unstable/terminated connection or a slow/dead peer application. Any diameter application response from the peer node is considered an assurance of the peer application being reachable and alive.

However, when there is not enough signaling to send on the connection, Diameter nodes use an application layer watchdog, DWR/DWA (Diameter Watchdog Request/Answer), to timely detect transport or application-layer failures. The time to wait before sending a watchdog message is controlled by a configurable timer Tw which is initially set to Twinit.

As per RFC 3539, the recommended value for Twinit is 30 seconds and it must not be set to less than 6 seconds minus a random jitter value. There is another timer (Tc) that controls the frequency of transport connection attempts to a peer with whom no active transport connection exists. The recommended value for Tc is also 30 seconds as per RFC 6733.

Consider an example situation where two Diameter nodes A and B have an established Diameter connection between them. If node A intends to close a connection, or if it goes out of service in a graceful manner, node A is expected to send a DPR (Disconnect-Peer-Request) message to node B.

However, if the node A abruptly becomes unavailable (e.g., it shuts down), it cannot send a DPR. As a result, the node B continues to assume that that node A is still alive. When node B doesn't see a response on this connection for Tw duration, it sends a DWR towards node A. If node A is still not operational, this DWR is lost. After waiting for another Tw duration, node B finally infers that node A is no longer in service and hence, it cleans up the peer state machine and closes the transport connection.

Figure 1:
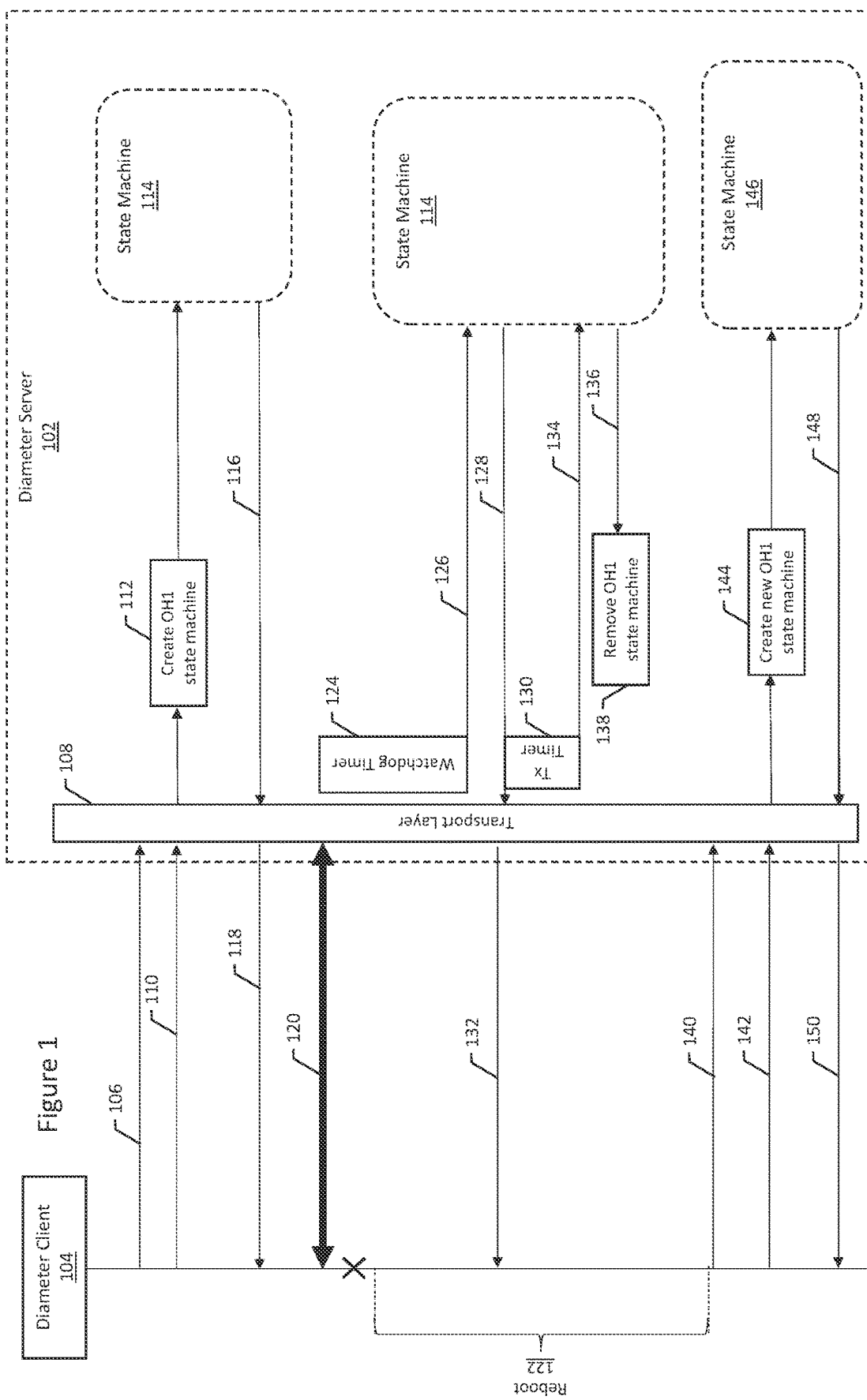
FIG. 1 is a message flow diagram illustrating messages sent between a Diameter server and a Diameter client.

This example is depicted in FIG. 1. As shown in FIG. 1, it might take up to twice the Tw time for a diameter node to detect a broken connection. Some implementations send DWR a few more times before declaring the peer as dead or unreachable.

FIG. 1 is a message flow diagram illustrating messages sent between a Diameter server 102 and a Diameter client 104. Diameter server 102 and Diameter client 104 can each be implemented on a computer system comprising at least one processor and memory. FIG. 1 depicts a scenario where Diameter server 102 determines that the connection is broken before Diameter client 104 finishes rebooting.

Diameter client 104 sends a message 106 to start a new transport connection at the transport layer 108 with Diameter server 102. Then Diameter client 104 sends a request message 110 to establish a Diameter connection with Diameter server 102. Request message 110 can be, e.g., a capabilities exchange request (CER) message with a Diameter identifier for Diameter client 104. The Diameter identifier can be, e.g., Origin-host OH1.

Diameter server 102 establishes the Diameter connection by creating 112 a peer state machine 114 for the connection. State machine 114 can change states between a closed state and an open state. State machine 114 is associated with the Diameter identifier for Diameter client 104, Origin-host OH1.

Diameter server 102 responds to request message 110 with a response message 116, e.g., a capabilities exchange answer (CEA). The request message 116 is sent 118 to Diameter client via transport layer 108. Diameter client 104 can then exchange various Diameter messages 120 with Diameter server 102, e.g., messages for operating a core network of a telecommunications network.

Then, Diameter client 104 begins to reboot 122. Diameter client 104 can begin rebooting for any of various reasons. Diameter client 104 is not rebooting gracefully, however, in that Diameter client 104 does not send a message to Diameter server 102 to close the Diameter connection.

At the same time, a watchdog timer 124 is running from the last time of the exchange of Diameter messages 120. When watchdog timer 124 expires, watchdog timer 124 sends a message 126 to state machine 114, which responds by sending a DWR message 128. A Diameter transmission timer 130 begins running. DWR message 128 is then sent 132 to Diameter client 104 by transport layer 108.

Diameter client 104, however, is still rebooting 122. Diameter client 104 therefore does not receive DWR message 132 or does not respond to DWR message 132; the message is lost. When transmission timer 130 expires, it sends a message 134 (e.g., R-Peer-Disc) to state machine 114.

State machine 114 determines that the Diameter connection is down in response to not receiving a DWA message before transmission timer 130 expires. Diameter server 102 frees 136 computing resources reserved for the Diameter connection and removes 138 state machine 114.

Diameter client 104 then finishes rebooting 122 and sends a new message 140 to establish a transport layer connection. Diameter client 104 sends a request message 142 to establish a Diameter connection, e.g., a CER message with an Origin-host=OH1. Diameter server 102 creates 144 a new Diameter connection by creating a new OH1 state machine 146. State machine 146 sends a response message 148, e.g., a CEA message. Diameter server 102 sends response message 150 using transport layer 108.

As a variation of the above-mentioned scenario, there is a possibility that node A restarts and comes back to service before node B could determine that node A is unreachable on the old connection. In this case, node A would immediately reset/abort the old transport connection (e.g., by sending TCP RST bit) if it receives a DWR (or any other message) from node B on the old connection since it would not recognize that connection anymore. Hence, node B will determine that the connection is broken as soon as it sends the first message after node A has resumed services. Upon receiving the reset indication, node B will clean-up the "old" diameter peer state machine. This scenario is depicted in FIG. 2.

Figure 2:
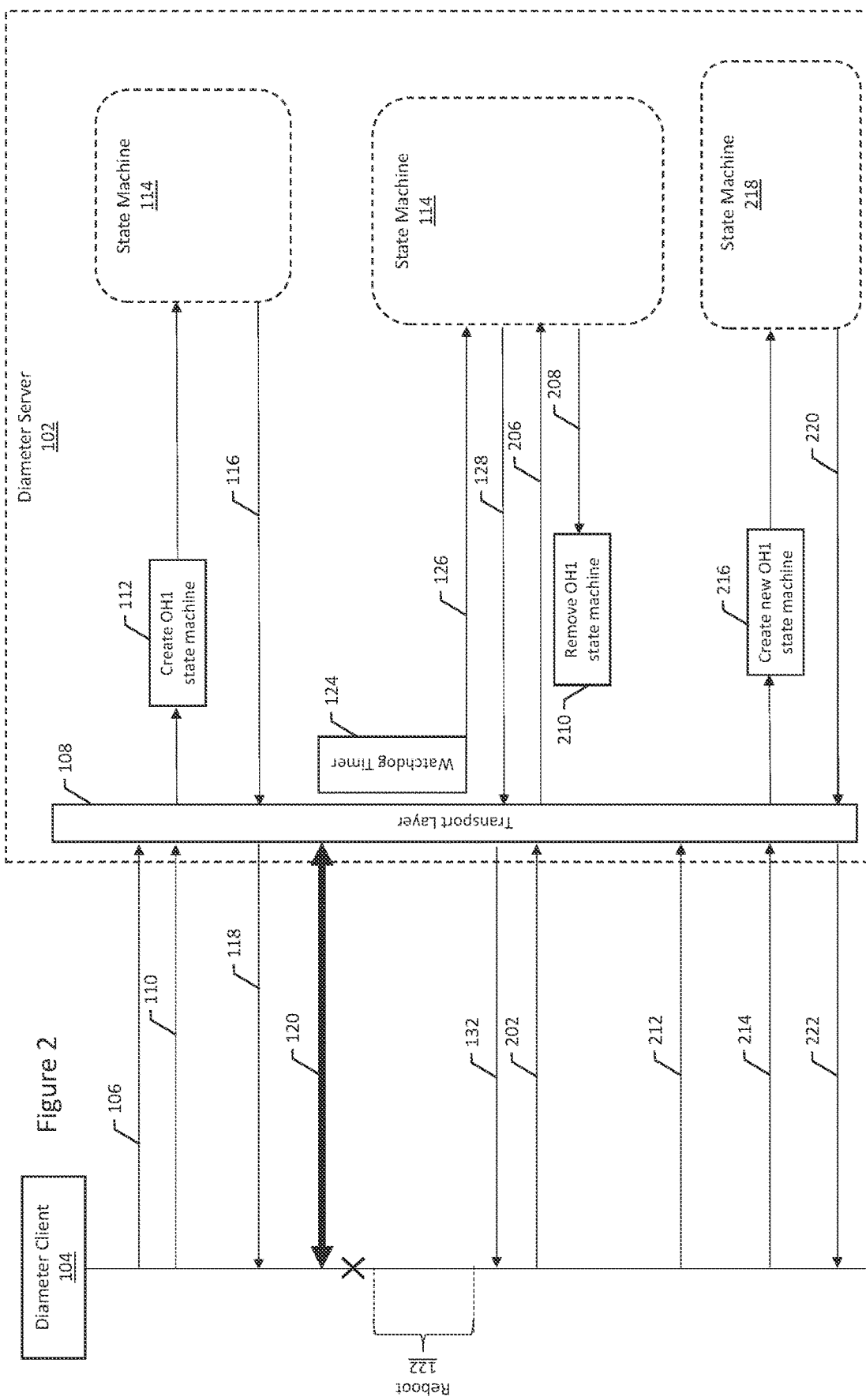
FIG. 2 is a message flow diagram illustrating an example situation where Diameter client finishes rebooting before Diameter server determines that Diameter client is unreachable on the old connection.

FIG. 2 is a message flow diagram illustrating an example situation where Diameter client 104 finishes rebooting before Diameter server 102 determines that Diameter client 104 is unreachable on the old connection.

Diameter client 104 sends a message 106 to start a new transport connection at the transport layer 108 with Diameter server 102. Then Diameter client 104 sends a request message 110 to establish a Diameter connection with Diameter server 102. Request message 110 can be, e.g., a capabilities exchange request (CER) message with a Diameter identifier for Diameter client 104. The Diameter identifier can be, e.g., Origin-host OH1.

Diameter server 102 establishes the Diameter connection by creating 112 a peer state machine 114 for the connection. State machine 114 can change states between a closed state and an open state. State machine 114 is associated with the Diameter identifier for Diameter client 104, Origin-host OH1.

Diameter server 102 responds to request message 110 with a response message 116, e.g., a capabilities exchange answer (CEA). The request message 116 is sent 118 to Diameter client via transport layer 108. Diameter client 104 can then exchange various Diameter messages 120 with Diameter server 102, e.g., messages for operating a core network of a telecommunications network.

Then, Diameter client 104 begins to reboot 122. Diameter client 104 can begin rebooting for any of various reasons. Diameter client 104 is not rebooting gracefully, however, in that Diameter client 104 does not send a message to Diameter server 102 to close the Diameter connection.

At the same time, a watchdog timer 124 is running from the last time of the exchange of Diameter messages 120. When watchdog timer 124 expires, watchdog timer 124 sends a message 126 to state machine 114, which responds by sending a DWR message 128. DWR message 128 is then sent 132 to Diameter client 104 by transport layer 108.

Diameter client 104 has finished rebooting 122 and receives DWR message 132. Diameter client 104 does not recognize the old connection and, in response, resets/aborts the old transport connection by sending a message 202, e.g., a TCP RST bit.

Diameter server 102 receives 206 the message 202. Diameter server 102 frees 208 computing resources reserved for the Diameter connection and removes 210 state machine 114.

Diameter client 104 sends a new message 212 to establish a transport layer connection. Diameter client 104 sends a request message 214 to establish a Diameter connection, e.g., a CER message with an Origin-host=OH1. Diameter server 102 creates 216 a new Diameter connection by creating a new OH1 state machine 218. State machine 218 sends a response message 220, e.g., a CEA message. Diameter server 102 sends 222 response message 220 using transport layer 108.

Consider another example situation, where node B is a Diameter server, and it would not have much (or any)

signaling to send to node A (client) except for DWR that it will send as per the configured Tw interval. In this case, even after the client node has resumed services, the server wouldn't immediately know that the previous connection is broken. To make it worse, the server would also reject the new Diameter connection requests (CER) sent by the client post restart.

This is so because upon receipt of the CER message, the server checks if there is an existing peer state machine for the same Origin-Host. As per RFC 6733, if the server finds an existing connection in R-open state (i.e. established state) with the same peer (identified by Origin-Host in CER), it should reject the CER and drop the transport connection on which the CER was received. The client is then expected to retry connecting after a Tc timer interval. This scenario is depicted in FIG. 3.

Figure 3:
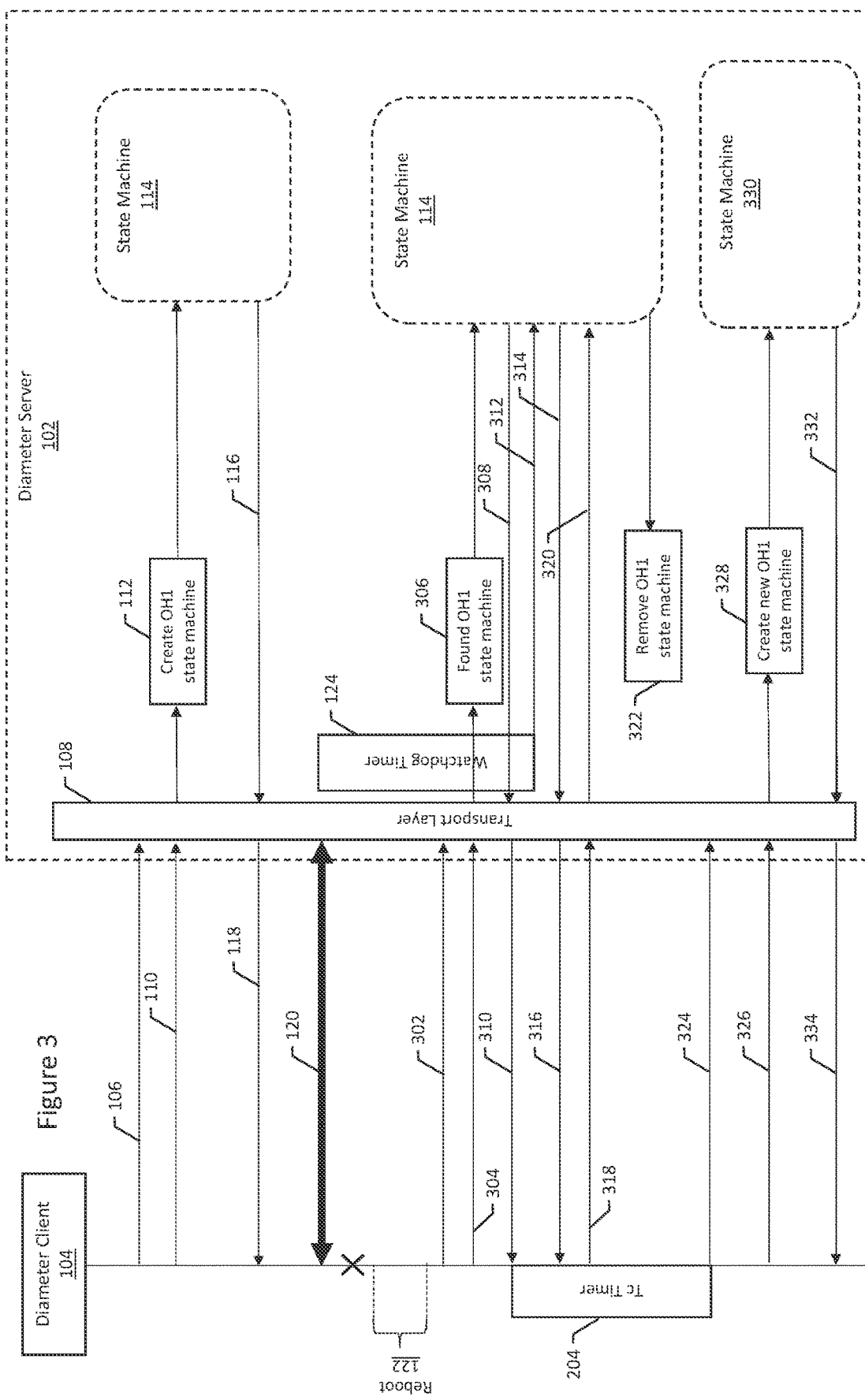
FIG. 3 is a message flow diagram illustrating an example situation where Diameter server does not immediately determine that the Diameter connection is broken after Diameter client has resumed services.

FIG. 3 is a message flow diagram illustrating an example situation where Diameter server 102 does not immediately determine that the Diameter connection is broken after Diameter client 104 has resumed services.

Diameter client 104 sends a message 106 to start a new transport connection at the transport layer 108 with Diameter server 102. Then Diameter client 104 sends a request message 110 to establish a Diameter connection with Diameter server 102. Request message 110 can be, e.g., a capabilities exchange request (CER) message with a Diameter identifier for Diameter client 104. The Diameter identifier can be, e.g., Origin-host OH1.

Diameter server 102 establishes the Diameter connection by creating 112 a peer state machine 114 for the connection. State machine 114 can change states between a closed state and an open state. State machine 114 is associated with the Diameter identifier for Diameter client 104, Origin-host OH1.

Diameter server 102 responds to request message 110 with a response message 116, e.g., a capabilities exchange answer (CEA). The request message 116 is sent 118 to Diameter client via transport layer 108. Diameter client 104 can then exchange various Diameter messages 120 with Diameter server 102, e.g., messages for operating a core network of a telecommunications network.

Then, Diameter client 104 begins to reboot 122. Diameter client 104 can begin rebooting for any of various reasons. Diameter client 104 is not rebooting gracefully, however, in that Diameter client 104 does not send a message to Diameter server 102 to close the Diameter connection. A watchdog timer 124 is running from the last time of the exchange of Diameter messages 120.

When Diameter client 104 resumes services, Diameter client 104 sends a message 302 to establish a new transport connection. Diameter client 104 sends a request message 304, e.g., a CER message with Origin-host=OH1. Diameter server 102 finds 306 that there is an existing state machine 114 with the same identifier, Origin-host=OH1. In response, Diameter server 102 rejects the request message 304, initiates 308 a disconnect of the transport connection, and sends a message 310 to close the transport connection.

When watchdog timer 124 expires, watchdog timer 124 sends a message 312 to state machine 114, which responds by sending a DWR message 314. DWR message 314 is then sent 316 to Diameter client 104 by transport layer 108.

Diameter client 104, in response, sends a message 318 to reset the transport connection. Diameter server 102 receives the message 318, e.g., as a R-Peer-Disc message 320. Diameter server 102 removes 322 state machine 114, freeing computing resources.

At the expiration of the Tc Timer, Diameter client 104 sends a new message 324 to establish a transport layer connection. Diameter client 104 sends a request message 326 to establish a Diameter connection, e.g., a CER message with an Origin-host=OH1. Diameter server 102 creates 328 a new Diameter connection by creating a new OH1 state machine 330. State machine 330 sends a response message 332, e.g., a CEA message. Diameter server 102 sends 334 response message 332 using transport layer 108.

The delay in restoring Diameter connectivity can potentially lead to service impacting issues at client such as call drops, accounting loss, authorization/accounting failures.

This problem may be more common when the client is deployed in a HA (High Availability, e.g. 1+1, n+1 or n+k) configuration as compared to when it is deployed as a standalone node. This is so because a standalone client node would typically take tens of seconds (or maybe a few minutes) to resume services post restart, and hence, it is quite likely that the server would have detected the broken connection by then (through watchdog failure mechanism shown in FIG. 1). Therefore, the connection will mostly get restored as soon as the client comes back to service.

In an HA configuration, when an Active node fails, one of the standby nodes takes over the Active role within a couple of seconds or even lesser (hereinafter referred to as "switchover"). Since the switchover time is much smaller as compared to the Tw timer value, the Client attempts to reestablish the Diameter connection much before the server could possibly detect connectivity loss by sending the next DWR on the old connection. In other words, there can be a long delay before the connection is restored, even though the client was operational immediately after the switchover (e.g. within 2 seconds). This scenario is depicted in FIG. 4.

Figure 4:
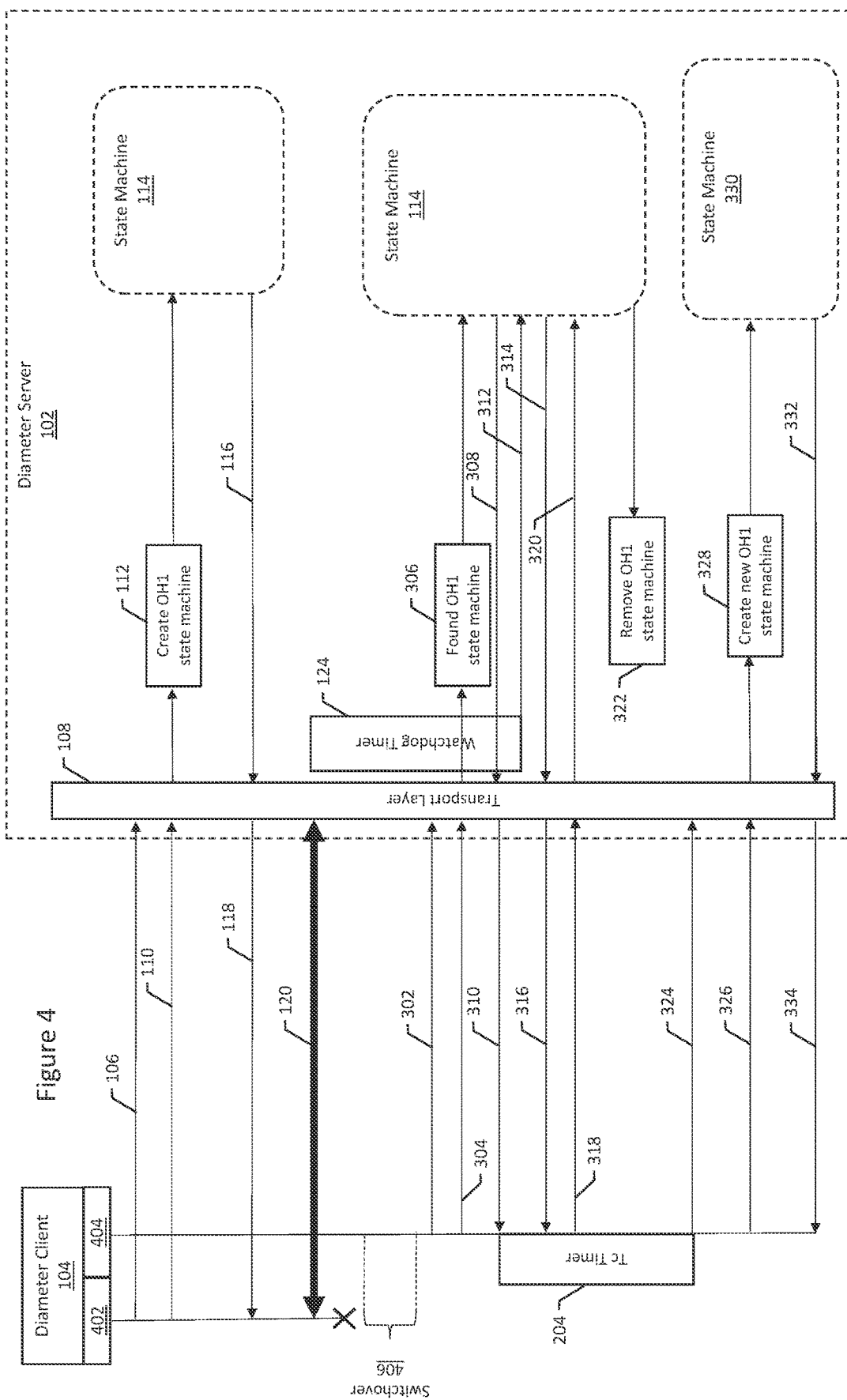
FIG. 4 is a message flow diagram illustrating an example high availability configuration.

FIG. 4 is a message flow diagram illustrating an example high availability configuration. Diameter client 104 includes an active node 402 and a standby node 404.

Diameter client 104 sends, using node 402, a message 106 to start a new transport connection at the transport layer 108 with Diameter server 102. Then Diameter client 104 sends a request message 110 to establish a Diameter connection with Diameter server 102. Request message 110 can be, e.g., a capabilities exchange request (CER) message with a Diameter identifier for Diameter client 104. The Diameter identifier can be, e.g., Origin-host OH1.

Diameter server 102 establishes the Diameter connection by creating 112 a peer state machine 114 for the connection. State machine 114 can change states between a closed state and an open state. State machine 114 is associated with the Diameter identifier for Diameter client 104, Origin-host OH1.

Diameter server 102 responds to request message 110 with a response message 116, e.g., a capabilities exchange answer (CEA). The request message 116 is sent 118 to Diameter client via transport layer 108. Diameter client 104 can then exchange various Diameter messages 120 with Diameter server 102, e.g., messages for operating a core network of a telecommunications network.

Then, Diameter client 104 begins to switchover 406 from active node 402 to standby node 404, which then becomes active. Diameter client 104 can begin switching over for any of various reasons. Diameter client 104 does not send a message to Diameter server 102 to close the Diameter connection. A watchdog timer 124 is running from the last time of the exchange of Diameter messages 120.

When Diameter client 104 resumes services, using node 404 which is now active, Diameter client 104 sends a message 302 to establish a new transport connection. Diameter client 104 sends a request message 304, e.g., a CER message with Origin-host=OH1. Diameter server 102 finds 306 that there is an existing state machine 114 with the same identifier, Origin-host=OH1. In response, Diameter server 102 rejects the request message 304, initiates 308 a disconnect of the transport connection, and sends a message 310 to close the transport connection.

When watchdog timer 124 expires, watchdog timer 124 sends a message 312 to state machine 114, which responds by sending a DWR message 314. DWR message 314 is then sent 316 to Diameter client 104 by transport layer 108.

Diameter client 104, in response, sends a message 318 to reset the transport connection. Diameter server 102 receives the message 318, e.g., as a R-Peer-Disc message 320. Diameter server 102 removes 322 state machine 114, freeing computing resources.

At the expiration of the Tc Timer, Diameter client 104 sends a new message 324 to establish a transport layer connection. Diameter client 104 sends a request message 326 to establish a Diameter connection, e.g., a CER message with an Origin-host=OH1. Diameter server 102 creates 328 a new Diameter connection by creating a new OH1 state machine 330. State machine 330 sends a response message 332, e.g., a CEA message. Diameter server 102 sends 334 response message 332 using transport layer 108.

A delay in restoring in Diameter connectivity can result when, once a connection request is rejected, the client would wait for another Tc Timer to expire before initiating a new request. This delay can be mitigated by a Diameter Server by detecting a broken old connection with a client as soon as it receives the first CER on the new connection from the same client. This allows the server to immediately cleanup the old peer state machine and accept the new connection, without having to wait for the next watchdog timeout, and without incurring any additional overhead.

When a Diameter server finds an existing peer state machine corresponding to the Origin-Host received in a CER, the Diameter server can determine if this CER could be a result of client restart or switchover, by implementing the following:

- The server shall put CER processing on conditional hold for a maximum time limit "hold-cer-timer" (e.g. 200 ms) that is much shorter than the typical transaction timeout used in Diameter (in the order of a few seconds).
- The server shall immediately, or as soon as possible, send DWR on the old connection.
- Since the server has already received a CER request from the client, it is expected that the client application is back in service and is ready to receive the DWR.
- If this is a case of client switchover, the DWR will reach the newly-Active node since it uses the same public IP as the previously-Active node.
- If this is a case of standalone client restart, the DWR would land at the original client node.
- In either case, the client would treat this as a message on an unexpected connection and should immediately reset/abort the connection (e.g. send back a TCP RST). This indication should typically reach at server within a few milliseconds (0-10 ms).
- Upon receipt of this reset indication, the transport layer at server shall immediately (or as soon as possible) inform the application about it which in turn would clean up the peer state machine.
- Since these steps can happen almost instantly, the server shall now resume CER processing, much before the hold-cer-timer expires. Since the original state machine would not exist anymore, the server shall now proceed as if it this is a fresh connection request from a new client, and shall accept the connection.
- If the server receives a DWA within the hold-cer-timer duration, this would indicate that the old connection is still alive, and hence the server shall behave as it does today i.e. reject the new CER and drop the new connection.
- If for some reason, the server does not receive a DWA or a transport reset indication within the hold-cer-timer time limit (e.g. when client is suffering from rolling reboots or back-to-back switchovers), the server reject the CER and drop the new connection. In other words, it will not be any worse than in the conventional approach, except that it would wait for a small duration (e.g. 200 ms) before rejecting the CER.

In summary, this approach allows servers to determine if the client has restarted or switched over, and accordingly accept the new connection request without any further delay. This can improve the speed of restoring Diameter connectivity compared to blindly rejecting connection attempts by a client post restart/switchover. This approach is depicted in FIG. 5.

Figure 5:
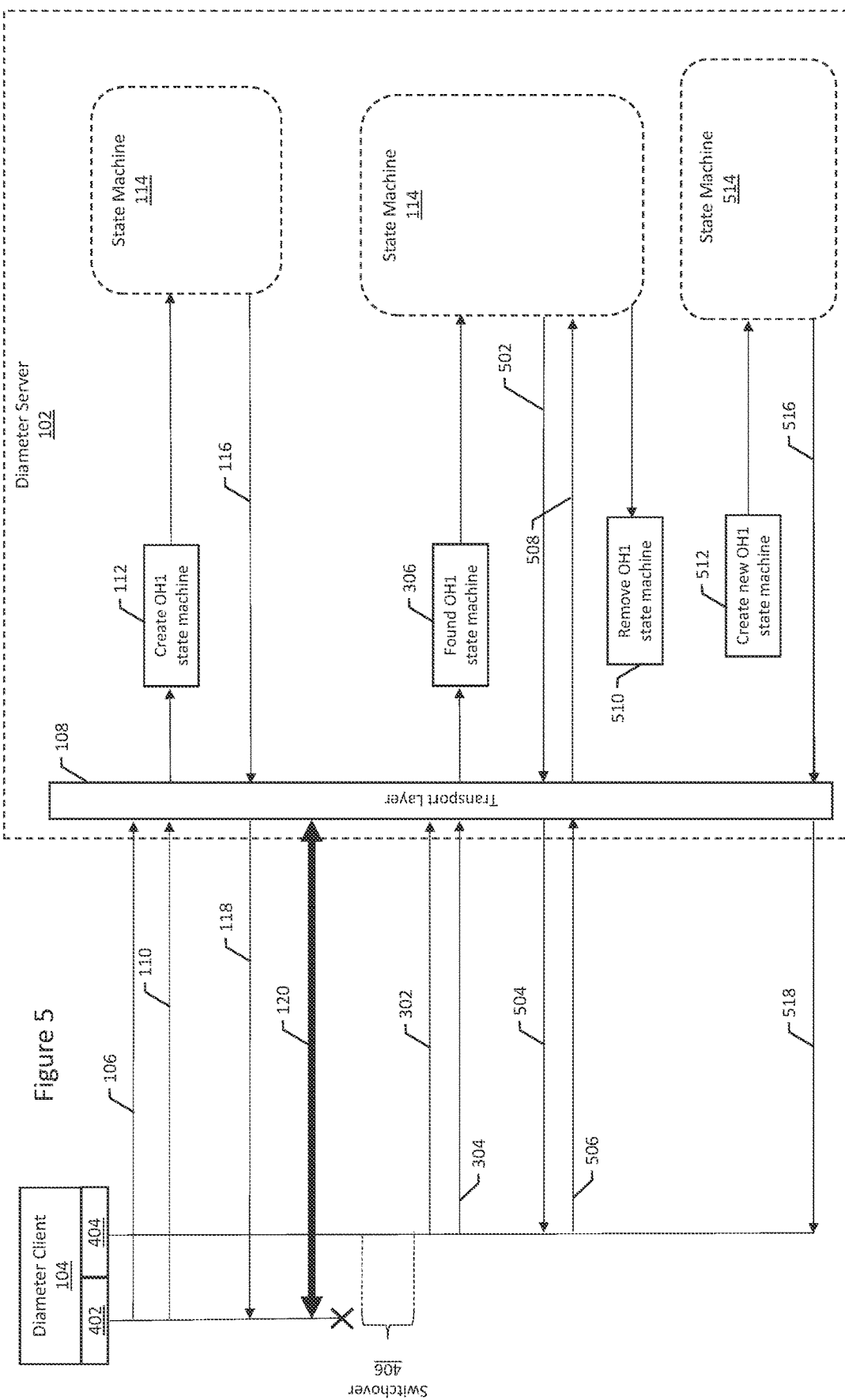
FIG. 5 is a message flow diagram illustrating restoration of Diameter connectivity.

FIG. 5 is a message flow diagram illustrating restoration of Diameter connectivity.

Diameter client 104 sends a message 106 to start a new transport connection at the transport layer 108 with Diameter server 102. Then Diameter client 104 sends a request message 110 to establish a Diameter connection with Diameter server 102. Request message 110 can be, e.g., a capabilities exchange request (CER) message with a Diameter identifier for Diameter client 104. The Diameter identifier can be, e.g., Origin-host OH1.

Diameter server 102 establishes the Diameter connection by creating 112 a peer state machine 114 for the connection. State machine 114 can change states between a closed state and an open state. State machine 114 is associated with the Diameter identifier for Diameter client 104, Origin-host OH1.

Diameter server 102 responds to request message 110 with a response message 116, e.g., a capabilities exchange answer (CEA). The request message 116 is sent 118 to Diameter client via transport layer 108. Diameter client 104 can then exchange various Diameter messages 120 with Diameter server 102, e.g., messages for operating a core network of a telecommunications network.

Then, Diameter client 104 begins to switchover 406 from active node 402 to standby node 404, which then becomes active. Diameter client 104 can begin switching over for any of various reasons. Diameter client 104 does not send a message to Diameter server 102 to close the Diameter connection. A watchdog timer 124 is running from the last time of the exchange of Diameter messages 120.

When Diameter client 104 resumes services, using node 404 which is now active, Diameter client 104 sends a message 302 to establish a new transport connection. Diameter client 104 sends a request message 304, e.g., a CER message with Origin-host=OH1. Diameter server 102 finds 306 that there is an existing state machine 114 with the same identifier, Origin-host=OH1.

Instead of rejecting request message 304, Diameter server 102 probes the Diameter connection by sending a DWR message 502. Diameter client 104 receives the DWR message 504 and treats the DWR message 504 as a message on an unexpected connection by sending back a message 506 to reset/abort the connection (e.g., send back a TCP RST). Transport layer 108 informs the Diameter application with a message 508. Diameter server 102 removes 510 state machine 114 and frees the computing resources used for the Diameter connection.

Diameter server 102 then creates 512 a new Diameter connection by creating a new peer state machine 514. Diameter server resumes CER processing and sends a CEA message 516, and transport layer 108 sends the message 518 to Diameter client 104 to finish establishing the new Diameter connection.

The solution proposed herein provides an efficient way for servers to reliably determine a client switchover/restart and restore connectivity without losing time. It also limits the scope of impact by sending the DWR on the affected connection and when a potential restart/switchover (at client) is suspected.

Figure 6:
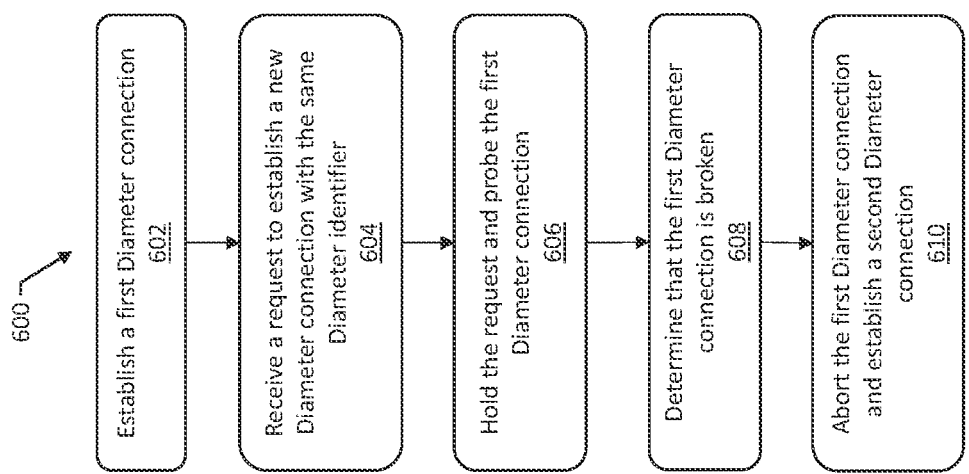
FIG. 6 is a flow diagram of an example method for restoring Diameter connectivity.

FIG. 6 is a flow diagram of an example method 600 for restoring Diameter connectivity. Method 600 can be performed by any appropriate Diameter node, e.g., a Diameter server. In some examples, the Diameter client is deployed in a high availability configuration having an active node and one or more standby nodes configured to takeover an active role in response to a failure of the active node.

Method 600 includes establishing 602 a first Diameter connection with a Diameter client having a Diameter identifier. For example, the Diameter client and server can exchange CER/CEA messages. Establishing the first Diameter connection can include creating a first peer state machine for the first Diameter connection with the Diameter identifier The Diameter client and the server may exchange Diameter messages on the first Diameter connection for some time before the Diameter client restarts (e.g., rebooting or switching over to a new active node).

Method 600 includes receiving 604 a request to establish a new Diameter connection with the Diameter identifier. Method 600 includes holding 606 the request to establish a new Diameter connection for a specified time limit, and, while holding the request, probing the first Diameter connection to determine whether the first Diameter connection has been broken. Probing the first Diameter connection can include sending a Diameter watchdog request to the Diameter client on the first Diameter connection. The specified time limit for holding the request to establish a new Diameter connection can be, e.g., less than or significantly less than a Diameter transaction timeout.

Method 600 includes determining 608 that the first Diameter connection has been broken. Determining that the first Diameter connection has been broken can include determining that the first Diameter connection has been broken before reaching the specified time limit. Determining that the first Diameter connection has been broken can include receiving a reset message from the Diameter client. The reset message can be a transmission control protocol (TCP) message sent as a result of the Diameter client treating the Diameter watchdog request as received on an unexpected connection.

Method 600 includes, in response to determining that the first Diameter connection has been broken, aborting 610 the first Diameter connection and establishing a second Diameter connection with the Diameter client having the Diameter identifier. Aborting the first Diameter connection and establishing the second Diameter connection can include cleaning up the first peer state machine and then resuming processing of the request to establish the new Diameter connection by creating a second peer state machine The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for restoration of Diameter connectivity, the method comprising:
   accepting a first Diameter connection with a Diameter client having a Diameter identifier;
   receiving a request to establish a new Diameter connection with the Diameter identifier;
   holding the request to establish a new Diameter connection for a specified time limit, and, while holding the request, probing the first Diameter connection to determine whether the first Diameter connection has been broken, wherein probing the first Diameter connection comprises sending a Diameter watchdog request to the Diameter client on the first Diameter connection; and
   determining that the first Diameter connection has been broken and, in response to determining that the first Diameter connection has been broken, aborting the first Diameter connection and accepting a second Diameter connection with the Diameter client having the Diameter identifier, wherein determining that the first Diameter connection has been broken comprises receiving a reset message from the Diameter client;
   wherein the reset message is a transmission control protocol (TCP) message sent as a result of the Diameter client treating the Diameter watchdog request as received on an unexpected connection.

2. The method of claim 1, wherein determining that the first Diameter connection has been broken comprises determining that the first Diameter connection has been broken before reaching the specified time limit while holding the request to establish the new Diameter connection.

3. The method of claim 1, wherein establishing the first Diameter connection comprises creating a first peer state machine for the first Diameter connection with the Diameter identifier.

4. The method of claim 3, wherein aborting the first Diameter connection and establishing the second Diameter connection comprises cleaning up the first peer state machine and then resuming processing of the request to establish the new Diameter connection by creating a second peer state machine.

5. The method of claim 1, wherein the Diameter client is deployed in a high availability configuration, and wherein the Diameter client comprises an active node and one or more standby nodes configured to takeover an active role in response to a failure of the active node.

6. The method of claim 1, wherein the specified time limit for holding the request to establish a new Diameter connection is less than a Diameter transaction timeout.

7. The method of claim 1, wherein establishing the first Diameter connection comprises establishing a transport connection and then receiving a capability exchange request (CER) message on the transport connection.

8. A system for restoration of Diameter connectivity, the system comprising:

at least one processor and a memory; and a Diameter server implemented by the at least one processor and configured for:

accepting a first Diameter connection with a Diameter client having a Diameter identifier;

receiving a request to establish a new Diameter connection with the Diameter identifier;

holding the request to establish a new Diameter connection for a specified time limit, and, while holding the request, probing the first Diameter connection to determine whether the first Diameter connection has been broken, wherein probing the first Diameter connection comprises sending a Diameter watchdog request to the Diameter client on the first Diameter connection; and determining that the first Diameter connection has been broken and, in response to determining that the first Diameter connection has been broken, aborting the first Diameter connection and accepting a second Diameter connection with the Diameter client having the Diameter identifier, wherein determining that the first Diameter connection has been broken comprises receiving a reset message from the Diameter client;

wherein the reset message is a transmission control protocol (TCP) message sent as a result of the Diameter client treating the Diameter watchdog request as received on an unexpected connection.

9. The system of claim 8, wherein determining that the first Diameter connection has been broken comprises determining that the first Diameter connection has been broken before reaching the specified time limit while holding the request to establish the new Diameter connection.

10. The system of claim 8, wherein establishing the first Diameter connection comprises creating a first peer state machine for the first Diameter connection with the Diameter identifier.

11. The system of claim 10, wherein aborting the first Diameter connection and establishing the second Diameter connection comprises cleaning up the first peer state machine and then resuming processing of the request to establish the new Diameter connection by creating a second peer state machine.

12. The system of claim 8, wherein the Diameter client is deployed in a high availability configuration comprising an active node and one or more standby nodes configured to takeover an active role in response to a failure of the active node.

13. The system of claim 8, wherein the specified time limit for holding the request to establish a new Diameter connection is less than a Diameter transaction timeout.

14. A non-transitory computer readable medium having stored thereon executable instructions that when executed by a processor of a computer control the computer to perform steps comprising:

accepting a first Diameter connection with a Diameter client having a Diameter identifier;

receiving a request to establish a new Diameter connection with the Diameter identifier;

holding the request to establish a new Diameter connection for a specified time limit, and, while holding the request, probing the first Diameter connection to determine whether the first Diameter connection has been broken, wherein probing the first Diameter connection comprises sending a Diameter watchdog request to the Diameter client on the first Diameter connection; and determining that the first Diameter connection has been broken and, in response to determining that the first Diameter connection has been broken, aborting the first Diameter connection and accepting a second Diameter connection with the Diameter client having the Diameter identifier, wherein determining that the first Diameter connection has been broken comprises receiving a reset message from the Diameter client;

wherein the reset message is a transmission control protocol (TCP) message sent as a result of the Diameter client treating the Diameter watchdog request as received on an unexpected connection.

\* \* \* \* \*

UNITED STATES PATENT AND TRADEMARK OFFICE
CERTIFICATE OF CORRECTION

| | | |
|---|---|---|
| PATENT NO. | : 12,047,224 B2 | Page 1 of 1 |
| APPLICATION NO. | : 17/491984 | |
| DATED | : July 23, 2024 | |
| INVENTOR(S) | : Grover et al. | |

It is certified that error appears in the above-identified patent and that said Letters Patent is hereby corrected as shown below:

On the Title Page

On page 2, Column 1, Item (56) under other publications, Line 4, after "Written" insert -- Opinion for International Application No. --, therefor.

Signed and Sealed this
Tenth Day of December, 2024

Katherine Kelly Vidal
*Director of the United States Patent and Trademark Office*